United States Patent
Furukawa

(10) Patent No.: US 10,418,149 B2
(45) Date of Patent: Sep. 17, 2019

(54) COMPOSITION FOR ELECTRIC WIRE COATING MATERIAL AND INSULATED ELECTRIC WIRE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Toyoki Furukawa, Mie (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 20 days.

(21) Appl. No.: 15/522,375

(22) PCT Filed: Oct. 21, 2015

(86) PCT No.: PCT/JP2015/079633
§ 371 (c)(1),
(2) Date: Apr. 27, 2017

(87) PCT Pub. No.: WO2016/076085
PCT Pub. Date: May 19, 2016

(65) Prior Publication Data
US 2018/0294071 A1    Oct. 11, 2018

(30) Foreign Application Priority Data
Nov. 11, 2014   (JP) .................... 2014-229070

(51) Int. Cl.
| | |
|---|---|
| *H01B 3/44* | (2006.01) |
| *C08L 27/06* | (2006.01) |
| *H01B 3/28* | (2006.01) |
| *C09D 127/06* | (2006.01) |
| *H01B 3/30* | (2006.01) |
| *C09D 7/63* | (2018.01) |
| *C09D 5/00* | (2006.01) |
| *H01B 3/42* | (2006.01) |

(52) U.S. Cl.
CPC .............. *H01B 3/443* (2013.01); *C08L 27/06* (2013.01); *C09D 5/00* (2013.01); *C09D 7/63* (2018.01); *C09D 127/06* (2013.01); *H01B 3/28* (2013.01); *H01B 3/302* (2013.01); *H01B 3/427* (2013.01)

(58) Field of Classification Search
CPC .......... H01B 3/443; H01B 3/302; C09D 7/63; C09D 5/00; C09D 127/06; B01B 3/427
USPC ......................................................... 524/298
See application file for complete search history.

(56) References Cited

U.S. PATENT DOCUMENTS

| | | | | |
|---|---|---|---|---|
| 4,035,440 | A * | 7/1977 | Khanna ................. | C08L 23/286 525/123 |
| 5,547,741 | A * | 8/1996 | Wilson ................... | C08L 27/06 428/215 |
| 9,685,255 | B2 * | 6/2017 | Lee ......................... | H01B 7/02 |
| 2012/0172511 | A1 * | 7/2012 | Furukawa ............... | H01B 3/443 524/296 |

FOREIGN PATENT DOCUMENTS

| | | | |
|---|---|---|---|
| CN | 101979434 | * | 2/2011 |
| CN | 101979434 B | | 10/2012 |
| CN | 103131103 | * | 6/2013 |
| CN | 103131103 A | | 6/2013 |
| JP | S5423890 B2 | | 8/1979 |
| JP | S5975504 A | | 4/1984 |
| JP | S6092345 A | | 5/1985 |
| JP | S6123213 U | | 2/1986 |
| JP | S6123214 U | | 2/1986 |
| JP | H0324216 U | | 3/1991 |
| JP | 2002322330 A | | 11/2002 |
| JP | 2011126980 A | | 6/2011 |
| JP | 2013129734 A | | 7/2013 |
| JP | 2014043508 A | | 3/2014 |
| JP | 2014133856 A | | 7/2014 |
| WO | WO2011152295 A1 | | 12/2011 |
| WO | WO2014163871 A | | 10/2014 |

OTHER PUBLICATIONS

International Search Report and Written Opinion for application PCT/JP2015/079633 dated Dec. 22, 2015; 6 Pages.
German Office Action for Application No. DE112015005107.4 dated Jun. 27, 2018; 4 pages.
English Translation of German Office Action for Application No. DE112015005107.4 dated Jun. 27, 2018; 1 page.

* cited by examiner

*Primary Examiner* — Hui H Chin
(74) *Attorney, Agent, or Firm* — Reising Ethington, P.C.

(57) ABSTRACT

A composition for an electric wire coating material that has excellent damage resistance, low-temperature flexibility, and tear resistance, and an insulated electric wire in which this composition is used. The composition for an electric wire coating material containing polyvinyl chloride contains a plasticizer in an amount of 15 to 30 parts by mass and a thermoplastic polyurethane elastomer in an amount of 0.01 to 10 parts by mass, with respect to 100 parts by mass of the polyvinyl chloride. An insulated electric wire is obtained by coating an outer circumference of a conductor with an insulating coating layer, using this composition for an electric wire coating material in an electric wire coating material.

4 Claims, 4 Drawing Sheets

COMPOSITION FOR ELECTRIC WIRE COATING MATERIAL AND INSULATED ELECTRIC WIRE

CROSS REFERENCE TO RELATED APPLICATIONS

This application claims the priority of Japanese patent application JP2014-229070 filed on Nov. 11, 2014, the entire contents of which are incorporated herein.

TECHNICAL FIELD

The present invention relates to a composition for an electric wire coating material and an insulated electric wire, and specifically to a composition for an electric wire coating material that is suitable as a coating material for an electric wire routed in a vehicle such as a car, and an insulated electric wire in which this composition is used.

BACKGROUND ART

Conventionally known is an electric wire coating material in which a polyvinyl chloride-containing composition that contains polyvinyl chloride is used. In order to provide flexibility, for example, usually, a plasticizer is blended into this type of electric wire coating material.

As this type of electric wire coating material, Patent Document 1 (Japanese Patent 5423890) discloses an electric wire coating material obtained by adding a plasticizer, chlorinated polyethylene, a methyl methacrylate-butadiene-styrene resin to polyvinyl chloride, for example. Also, for example, Patent Document 2 (JP 2002-322330A) discloses an electric wire coating material obtained by adding a plasticizer, high-density polyethylene (HDPE), ethylene-vinyl acetate-vinyl chloride copolymer to polyvinyl chloride.

SUMMARY

In an electric wire coating material in which a polyvinyl chloride-containing composition is used, if the amount of a plasticizer is increased, the material has excellent flexibility, but there is a high possibility that the electric wire coating will deteriorate due to external damage and its damage resistance tends to decrease. In view of this, if the amount of the plasticizer is reduced, its damage resistance tends to increase, but its low-temperature characteristics decrease. To address this problem in Patent Document 1, low-temperature characteristics are ensured by adding chlorinated polyethylene and a methyl methacrylate-butadiene-styrene resin to polyvinyl chloride.

However, if the amount of the plasticizer in an electric wire coating material in which a polyvinyl chloride-containing composition is used is reduced, there is the problem that not only its low-temperature characteristics decrease but also the electric wire coating cracks when a load is applied to the electric wire coating, e.g. by bending it after a minute damage is formed externally on the electric wire coating (decrease in tear resistance). In particular, reducing the thickness of the electric wire coating when trying to decrease the diameter of an electric wire makes this problem significant.

An object of the present design is to provide a composition for an electric wire coating material that has excellent damage resistance, low-temperature flexibility, and tear resistance, and an insulated electric wire in which this composition is used.

In order to resolve the above-described issue, in a composition for an electric wire coating material according to the present design, the composition for an electric wire coating material containing polyvinyl chloride contains a plasticizer in an amount of 15 to 30 parts by mass and a thermoplastic polyurethane elastomer in an amount of 0.01 to 10 parts by mass, with respect to 100 parts by mass of the polyvinyl chloride.

It is preferable that a soft segment of the thermoplastic polyurethane elastomer includes a polyether chain. Also, it is preferable that a Shore hardness of the thermoplastic polyurethane elastomer is in a range of A75 to A85.

It is preferable that the plasticizer is one or more of phthalic acid esters, trimellitic acid esters, pyromellitic acid esters, adipic acid esters, and sebacic acid esters.

In an insulated electric wire according to the present design, the composition for an electric wire coating material according to any of the above-described aspects is used in an electric wire coating material.

According to the composition for an electric wire coating material, the composition for an electric wire coating material containing polyvinyl chloride contains a plasticizer in an amount of 15 to 30 parts by mass and a thermoplastic polyurethane elastomer in an amount of 0.01 to 10 parts by mass, with respect to 100 parts by mass of polyvinyl chloride, and thus the composition for an electric wire coating material has excellent damage resistance, low-temperature flexibility, and tear resistance. Also, an insulated electric wire in which this composition is used in an electric wire coating material has excellent damage resistance, low-temperature flexibility, and tear resistance.

If the soft segment of the thermoplastic polyurethane elastomer includes a polyether chain, the composition has excellent low-temperature flexibility and tear resistance. If the Shore hardness of the thermoplastic polyurethane elastomer is in a range of A75 to A85, the composition has an excellent balance between damage resistance, low-temperature flexibility, and tear resistance. If the plasticizer is one or more of phthalic acid esters, trimellitic acid esters, pyromellitic acid esters, adipic acid esters, and sebacic acid esters, the composition has excellent low-temperature flexibility and tear resistance.

BRIEF DESCRIPTION OF DRAWINGS

FIG. 1 shows cross-sectional views of an insulated electric wire according to a first embodiment.

Figure 1A:
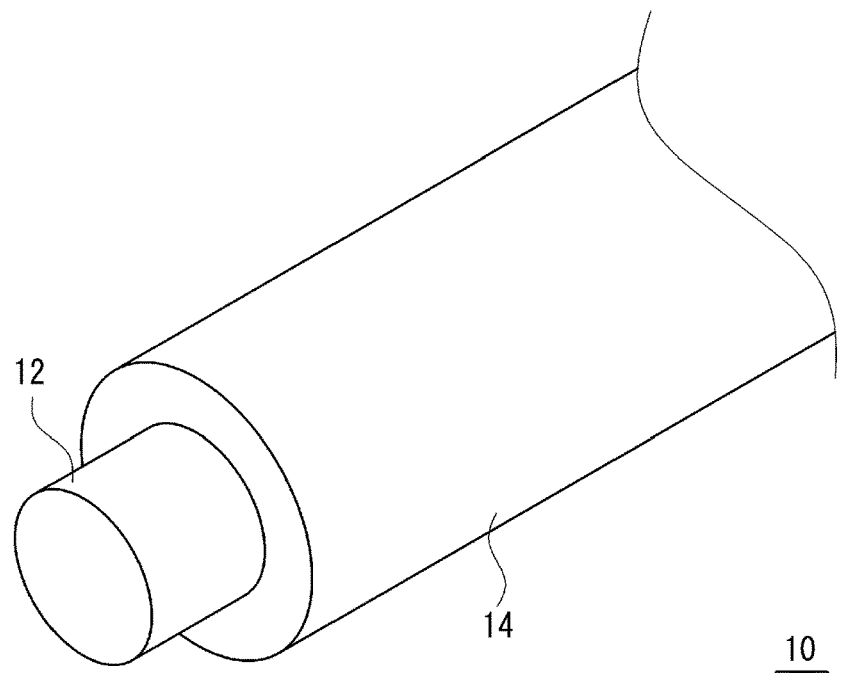
FIG. 1(a) shows a perspective view and FIG. 1(b) shows a cross-sectional view in its circumferential direction.

Next, an embodiment of the present design will be described in detail.

A composition for an electric wire coating material may contain polyvinyl chloride, and contains a plasticizer and a thermoplastic polyurethane elastomer, in addition to polyvinyl chloride.

The composition contains the plasticizer in an amount of 15 to 30 parts by mass with respect to 100 parts by mass of polyvinyl chloride. If the content of the plasticizer exceeds 30 parts by mass, its damage resistance is not satisfactory, and thus the content of the plasticizer is set to not more than 30 parts by mass. Also, if the content of the plasticizer is less than 15 parts by mass, its low-temperature flexibility and tear resistance are not satisfactory, and thus the content of the plasticizer is set to at least 15 parts by mass. The content of the plasticizer is more preferably in a range of 20 to 30 parts by mass.

Although there is no limitation to the plasticizer, from the viewpoint of obtaining excellent low-temperature flexibility and tear resistance, phthalic acid esters, trimellitic acid esters, pyromellitic acid esters, adipic acid esters, and sebacic acid esters are preferable. These may be used alone or in combination as the plasticizer.

Examples of alcohol that constitutes an ester for the plasticizer include saturated fatty alcohols each having 8 to 13 carbon atoms. One or more of these alcohols may be used. More specifically, examples of alcohol include 2-ethylhexyl, n-octyl, isononyl, dinonyl, isodecyl, and tridecyl alcohols.

If the composition contains the plasticizer in an amount of 15 to 30 parts by mass with respect to 100 parts by mass of polyvinyl chloride, the composition contains the thermoplastic polyurethane elastomer in an amount of 0.01 to 10 parts by mass with respect to 100 parts by mass of polyvinyl chloride. If the content of the thermoplastic polyurethane elastomer exceeds 10 parts by mass, its damage resistance is not satisfactory, and thus the content of the thermoplastic polyurethane elastomer is set to not more than 10 parts by mass. Also if the content of the thermoplastic polyurethane elastomer is less than 0.01 parts by mass, its tear resistance is not satisfactory and the effect of improving the low-temperature flexibility is small. Therefore, the content of the thermoplastic polyurethane elastomer is set to at least 0.01 parts by mass. The content of the thermoplastic polyurethane elastomer is more preferably in a range of 0.05 to 10 parts by mass, and even more preferably in a range of 0.1 to 10 parts by mass.

Although there is no particular limitation to the thermoplastic polyurethane elastomer, its soft segment preferably includes a polyether chain from the viewpoint of obtaining excellent low-temperature flexibility and tear resistance. Also, from the viewpoint of obtaining excellent damage resistance, the Shore hardness of the thermoplastic polyurethane elastomer is preferably at least A75. Also, from the viewpoint of obtaining excellent low-temperature flexibility and tear resistance, the Shore hardness of the thermoplastic polyurethane elastomer is preferably not more than A85.

Examples of the thermoplastic polyurethane elastomer include polyether-based thermoplastic polyurethane elastomers whose soft segment includes a polyether chain and polyester-based thermoplastic polyurethane elastomers whose soft segment includes a polyester chain.

Although there is no particular limitation to polyvinyl chloride, from the viewpoint of obtaining excellent damage resistance, the degree of polymerization is preferably at least 800. Also, from the viewpoint of obtaining excellent tear resistance, the degree of polymerization is preferably not more than 2800. More preferably, the degree of polymerization is in a range of 1300 to 2500.

The composition for an electric wire coating material according to the present design may also contain other components than polyvinyl chloride, the plasticizer, and the thermoplastic polyurethane elastomer within a range not impairing the object of the present design. Examples of other components include additives that are usually used in an electric wire coating material, such as stabilizers, processing aids, low-temperature modifiers, and expanders.

An example of a processing aid is chlorinated polyethylene. Examples of low-temperature modifiers include methyl methacrylate-butadiene-styrene copolymers (MBS). Although there is no particular limitation to the content of the low-temperature modifier, from the viewpoint of obtaining excellent damage resistance, the content of the low-temperature modifier is preferably not more than 6 parts by mass with respect to 100 parts by mass of polyvinyl chloride. The content of the low-temperature modifier is more preferably not more than 4 parts by mass and even more preferably not more than 3 parts by mass. Also, from the viewpoint of obtaining excellent low-temperature flexibility, the content of the low-temperature modifier is preferably at least 1 part by mass with respect to 100 parts by mass of polyvinyl chloride.

The composition for an electric wire coating material can be prepared by blending, into polyvinyl chloride that serves as a base resin, the plasticizer, the thermoplastic polyurethane elastomer, and various additive components that are added as needed and kneading while heating the mixture, for example. At this time, a general kneader such as a banbury mixer, a pressure kneader, a kneading extruder, a twin screw extruder, or a roll may be used. Before the mixture is kneaded and heated, the components may be dry-blended in advance using a tumbler or the like. After the mixture is kneaded and heated, a composition is retrieved from the kneader. At this time, the composition may be molded into pellets using a pelletizer.

Next, an insulated electric wire according to the present design will be described.

Figure 1B:
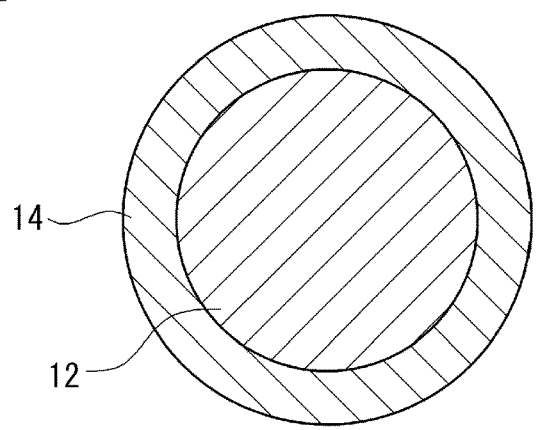

FIG. 1(a) shows a perspective view of an insulated electric wire according to one embodiment and FIG. 1(b) shows a cross-sectional view (cross-sectional view in its circumferential direction). As shown in FIG. 1, an insulated electric wire 10 includes a conductor 12 and an insulating coating layer (electric wire coating material) 14 for coating the outer circumference of the conductor 12. The insulating coating layer 14 is formed using the composition for an electric wire coating material according to the present design. The insulated electric wire 10 can be obtained by subjecting the outer circumference of the conductor 12 to extrusion coating with the composition for an electric wire coating material according to the present design.

Although copper is ordinarily used as the conductor 12, a metal material such as aluminum or magnesium may also be used instead of copper. The metal material may also be an alloy. In order to obtain an alloy, Examples of other metals for obtaining an alloy include iron, nickel, magnesium, silicon, and combinations thereof. The conductor 12 may be constituted by a single wire or a twisted wire obtained by twisting a plurality of wires.

According to the composition for an electric wire coating material and the insulated electric wire having the above-described configurations, the composition for an electric wire coating material contains the plasticizer in an amount of 15 to 30 parts by mass and the thermoplastic polyurethane elastomer in an amount of 0.01 to 10 parts by mass with respect to 100 parts by mass of polyvinyl chloride, and thus has excellent damage resistance, low-temperature flexibility, and tear resistance. Moreover, since the composition contains a predetermined amount of the thermoplastic polyurethane elastomer, its low-temperature flexibility is maintained without increasing the amount of the plasticizer, and its tear resistance is also satisfactory.

WORKING EXAMPLES

Hereinafter, working examples of the present design will be described in detail, but the present invention is not limited to the working examples.

Working Example 1

Preparation of Composition for Electric Wire Coating Material

As shown in Table 1, a single screw extruder was used to mix, at 180° C., 100 parts by mass of polyvinyl chloride (with a degree of polymerization of 1300), 25 parts by mass of a trimellitic acid ester, 5 parts by mass of an ether-based thermoplastic polyurethane elastomer (whose Shore hardness was A75), and 5 parts by mass of a non-lead heat stabilizer, and a pelletizer was used to mold the obtained mixture into pellets. As a result, a composition for an electric wire coating material containing polyvinyl chloride was prepared.

Preparation of Insulated Electric Wire

An insulated electric wire was produced by extrusion molding the prepared composition for an electric wire coating material around a twisted wire conductor having a cross-sectional area of 0.5 mm$^2$ at a coating thickness of 0.2 mm.

Working Examples 2 and 3

Compositions for an electric wire coating material were prepared and insulated electric wires were produced similarly to Working Example 1, except that the blending amount of the ether-based thermoplastic polyurethane elastomer (whose Shore hardness was A75) was changed.

Working Examples 4 to 7

Compositions for an electric wire coating material were prepared and insulated electric wires were produced similarly to Working Example 1, except that the type of thermoplastic polyurethane elastomer was changed.

Working Example 8

A composition for an electric wire coating material was prepared and an insulated electric wire was produced similarly to Working Example 1, except that the type of polyvinyl chloride was changed.

Working Examples 9 to 10

Compositions for an electric wire coating material were prepared and insulated electric wires were produced similarly to Working Example 1, except that the blending amount of the trimellitic acid ester was changed.

Working Examples 11 to 14

Compositions for electric wire coating materials were prepared and insulated electric wires were produced similarly to Working Example 1, except that the type of plasticizer was changed.

Working Examples 15 to 17

Compositions for electric wire coating materials were prepared and insulated electric wires were produced similarly to Working Example 1, except that an additive was added.

Comparative Example 1

A composition for an electric wire coating material was prepared and an insulated electric wire was produced similarly to Working Example 1, except that no thermoplastic polyurethane elastomer was blended into it.

Comparative Examples 2 and 3

Compositions for electric wire coating materials were prepared and insulated electric wires were produced similarly to Working Example 1, except that the blending amount of the thermoplastic polyurethane elastomer was changed.

Comparative Example 4

A composition for an electric wire coating material was prepared and an insulated electric wire was produced similarly to Working Example 1, except that a low-temperature modifier (10 parts by mass) was blended into it instead of the thermoplastic polyurethane elastomer.

Comparative Examples 5 and 6

Compositions for electric wire coating materials were prepared and insulated electric wires were produced similarly to Working Example 1, except that the blending amount of the trimellitic acid ester was changed.

Used Material
 Polyvinyl chloride
  Degree of polymerization 1300: "Shin Daiichi Vinyl Corp., ZEST1300Z"
  Degree of polymerization 2500: "Shin Daiichi Vinyl Corp., ZEST2500Z"
 Plasticizer
  Phthalic acid ester: "J-PLUS Co., Ltd., DUP"
  Trimellitic acid ester: "DIC Corporation, W-750"
  Pyromellitic acid ester: "DIC Corporation, W-7010"
  Adipic acid ester: "DIC Corporation, W-242"
  Sebacic acid ester: "DIC Corporation, W-280"
 Thermoplastic Polyurethane Elastomer
  Ether-based, with Shore hardness of A73; "BASF Japan Ltd., Elastollan C70A10WN"
  Ether-based, with Shore hardness of A75: "DIC Bayer Polymer Ltd., PANDEX T-8175"
  Ether-based, with Shore hardness of A85: "BASF Japan Ltd., Elastollan ET385"
  Ester-based, with Shore hardness A77: "Dainichiseika Color & Chemicals Mfg. Co., Ltd., RESAMINE P-1275"
 Processing aid (chlorinated polyethylene): "Showa Denko K.K., Elaslen 301A"
 Low-temperature modifier (MBS): "Kaneka Corporation, KANE ACE B-564"
 Expander (calcium carbonate): "SHIRAISHI CALCIUM KAISHA, LTD., Hakuenka CCR"
 Non-lead heat stabilizer: "ADEKA CORPORATION, RUP-100"

Evaluation

The damage resistance, low-temperature flexibility, and tear resistance of the produced insulated electric wires were evaluated based on the following evaluation methods.

Evaluation Methods

Damage Resistance Evaluation

Figure 2A:
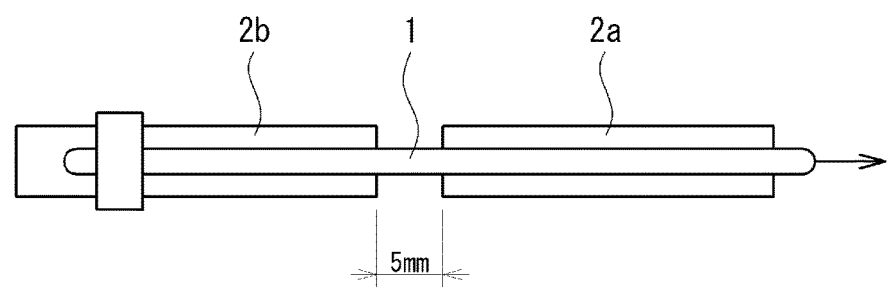
FIG. 2 shows a schematic diagram illustrating a method for evaluating damage resistance.
Figure 2B:
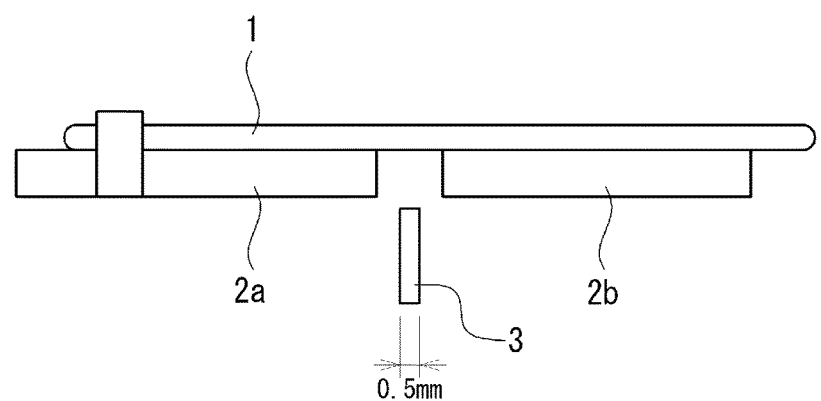

A test piece was obtained by cutting the produced insulated electric wire to 300-mm length. As shown in FIGS. 2(a) (plan view) and 2(b) (side view), a test piece 1 was placed on plastic plates 2a and 2b. The distance between the plastic plate 2a and the plastic plate 2b was 5 mm. The left end of the test piece 1 was fixed to the plastic plate 2b, and the test piece 1 was made straight by applying a tensile stress of 30 N to the right end of the test piece 1. Next, a metal piece 3 having a thickness of 0.5 mm was disposed at a position located 1 cm below a portion of the test piece 1 disposed between the plastic plate 2a and the plastic plate 2b and about 0.8 mm away from the center in the radial direction of the test piece 1 to its outer circumferential side.

Figure 3A:
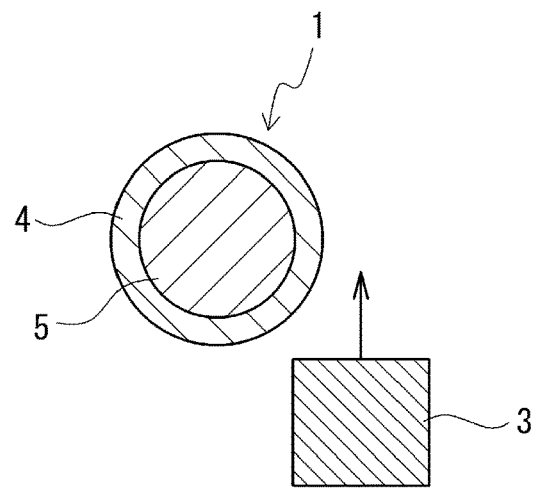
FIG. 3 shows a schematic diagram illustrating a method for evaluating damage resistance.
Figure 3B:
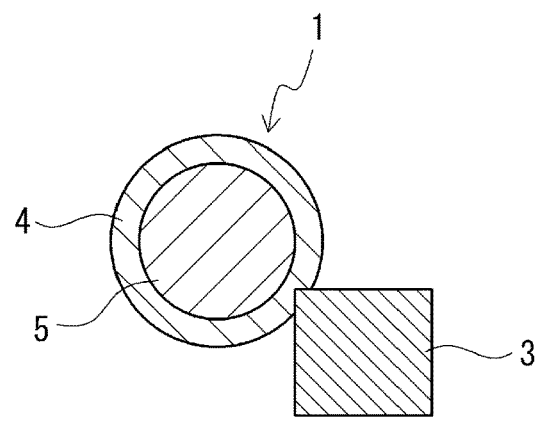
Figure 3C:
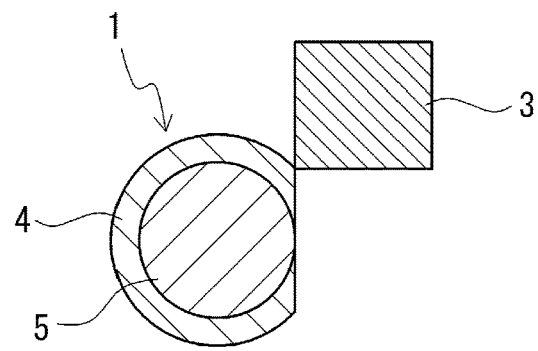

Next, as shown in FIGS. 3(a) to 3(c), the metal piece 3 was moved upward at a speed of 50 mm/min while the metal piece 3 was brought into contact with a coating material 4 of the test piece 1, and a load that was applied to the metal piece 3 of the test piece 1 was measured. At that time, if a conductor 5 of the test piece 1 was not exposed, the metal piece 3 was brought closer to the test piece 1 in the central direction in steps of 0.01 mm each, and measurement was continued until the conductor 5 was exposed. The upper limit load at which the conductor 5 was not exposed was regarded as the damage resistance capability of the test piece 1. If the conductor 5 was not exposed at a load of at least 12 N, its damage resistance was regarded as acceptable "O", whereas if the conductor 5 was not exposed at a load of at least 15 N, its damage resistance was regarded as superior "⊚". On the other hand, if the conductor 5 was exposed at a load of less than 12 N, its damage resistance was regarded as not acceptable "x".

Low-Temperature Flexibility Evaluation

Figure 4:
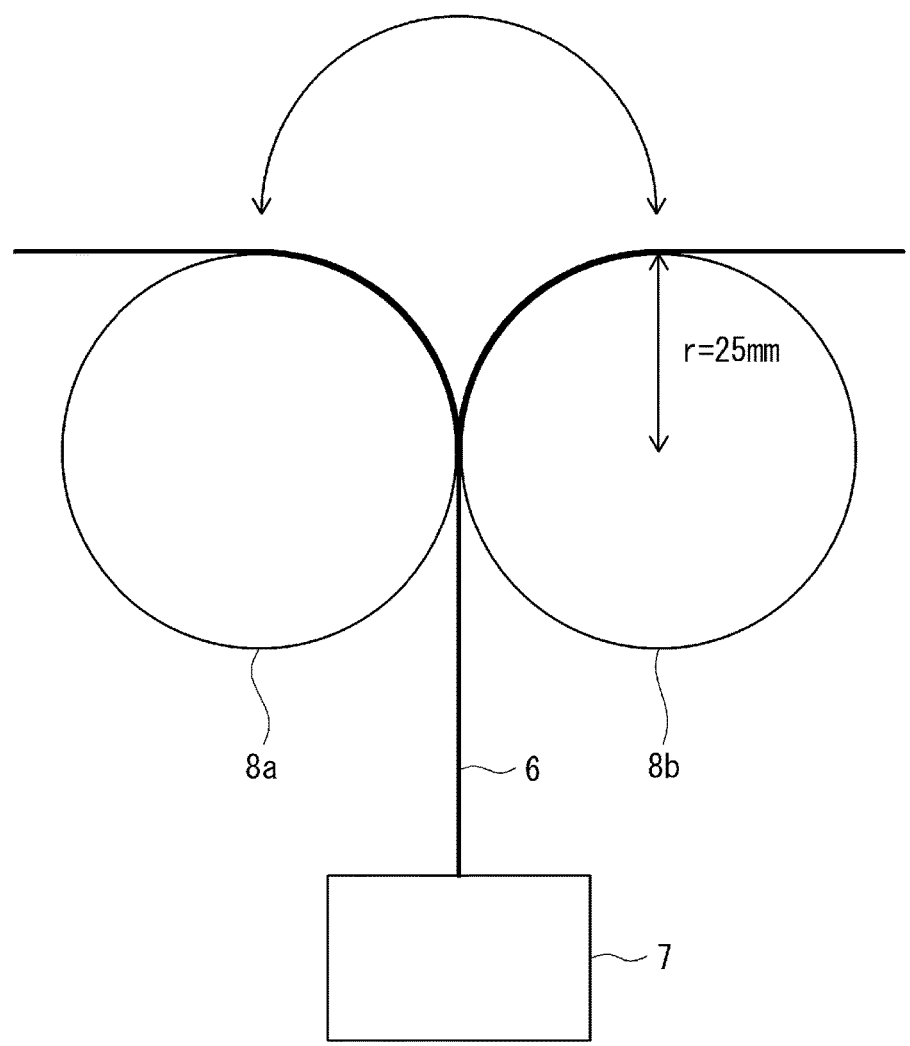
FIG. 4 shows a schematic diagram illustrating a method for evaluating low-temperature flexibility.

A test piece was obtained by cutting the produced insulated electric wire to 350-mm length. 20 mm of the coating material was removed at both ends of that test piece. Next, as shown in FIG. 4, in a state in which one end of a test piece 6 was fixed to a rotary arm, a weight 7 was suspended from the other end, and the middle portion in the longitudinal direction of the test piece 6 was sandwiched between a pair of cylindrical members 8a and 8b (radium r=25 mm), low-temperature flexibility was evaluated by repeatedly bending the test piece 6 at a bending radius r through rotating the rotary arms at 90 degrees in one direction and at 90 degrees in the other direction such that the test piece 6 moved along the circumferential surfaces of the cylindrical members 8a and 8b. The load that was applied to the test piece 6 was 400 g, the testing temperature was −30° C., and the speed for repeating a bending operation was 60 round trips per minute. Flexibility was evaluated with the number of instances of bending (number of round trips) until the test piece 6 broke in the bending test. If a test piece was bent at least 2000 times, it was regarded as acceptable "O", whereas if a test piece was bent at least 3000 times, it was regarded as particularly excellent "⊚".

Tear Resistance Evaluation

An angled test piece as described in JIS K 6252 was produced using a sheet having a thickness of 1 mm that was produced using the prepared composition for an electric wire coating material, and its tear resistance was evaluated using a tension tester. The tear resistance was evaluated with a distance of 20 mm between the grips and a tension speed of 50 mm/min. If a test piece was fractured at a stroke of at least 10 mm (an apparent strain of at least 50%), its tear resistance was regarded as acceptable "O", whereas if a test piece was fractured at a stroke of at least 20 mm (apparent strain was 100%), its tear resistance was regarded as superior "⊚". On the other hand, if a test piece was fractured at a stroke of less than 10 mm, its tear resistance was regarded as not acceptable "x".

The blending ratios of the electric wire coating materials and evaluation results are shown in Tables 1 to 3. Note that the values shown in Tables 1 to 3 are expressed in parts by mass.

TABLE 1

| | | Working Example | | | | | | | |
|---|---|---|---|---|---|---|---|---|---|
| | | 1 | 2 | 3 | 4 | 5 | 6 | 7 | 8 |
| Polyvinyl chloride | degree of polymerization 1300 | 100 | 100 | 100 | 100 | 100 | 100 | 100 | |
| | degree of polymerization 2500 | | | | | | | | 100 |
| Plasticizer | phthalic acid ester | | | | | | | | |
| | trimellitic acid ester | 25 | 25 | 25 | 25 | 25 | 25 | 25 | 25 |
| | pyromellitic acid ester | | | | | | | | |
| | adipic acid ester | | | | | | | | |
| | sebacic acid ester | | | | | | | | |
| Thermoplastic polyurethane elastomer | ether-based•A73 | | | | | 5 | | | |
| | ether-based•A75 | 5 | 0.1 | 10 | | | | | 5 |
| | ether-based•A85 | | | | | | 5 | | |
| | ether-based•A90 | | | | | | | 5 | |
| | ester-based•A77 | | | | 5 | | | | |
| Additive | processing aid | | | | | | | | |
| | low-temperature modifier | | | | | | | | |
| | expander | | | | | | | | |
| | non-lead heat stabilizer | 5 | 5 | 5 | 5 | 5 | 5 | 5 | 5 |

TABLE 1-continued

|  |  | Working Example |  |  |  |  |  |  |  |
|---|---|---|---|---|---|---|---|---|---|
|  |  | 1 | 2 | 3 | 4 | 5 | 6 | 7 | 8 |
| Evaluation result | damage resistance | ⊚ | ⊚ | ⊚ | ⊚ | ○ | ⊚ | ⊚ | ⊚ |
|  | tear resistance | ⊚ | ⊚ | ⊚ | ○ | ⊚ | ⊚ | ○ | ⊚ |
|  | low-temperature flexibility | ⊚ | ⊚ | ⊚ | ○ | ⊚ | ⊚ | ○ | ⊚ |

TABLE 2

|  |  | Working Example |  |  |  |  |  |  |  |  |
|---|---|---|---|---|---|---|---|---|---|---|
|  |  | 9 | 10 | 11 | 12 | 13 | 14 | 15 | 16 | 17 |
| Polyvinyl chloride | degree of polymerization 1300 | 100 | 100 | 100 | 100 | 100 | 100 | 100 | 100 | 100 |
|  | degree of polymerization 2500 |  |  |  |  |  |  |  |  |  |
| Plasticizer | phthalic acid ester |  |  |  | 25 |  |  |  |  |  |
|  | trimellitic acid ester | 15 | 30 |  |  |  |  | 25 | 25 | 25 |
|  | pyromellitic acid ester |  |  | 25 |  |  |  |  |  |  |
|  | adipic acid ester |  |  |  |  | 25 |  |  |  |  |
|  | sebacic acid ester |  |  |  |  |  | 25 |  |  |  |
| Thermoplastic polyurethane elastomer | ether-based•A73 |  |  |  |  |  |  |  |  |  |
|  | ether-based•A75 | 5 | 5 | 5 | 5 | 5 | 5 | 5 | 5 | 5 |
|  | ether-based•A85 |  |  |  |  |  |  |  |  |  |
|  | ether-based•A90 |  |  |  |  |  |  |  |  |  |
|  | ester-based•A77 |  |  |  |  |  |  |  |  |  |
| Additive | processing aid |  |  |  |  |  |  | 2 |  |  |
|  | low-temperature modifier |  |  |  |  |  |  |  | 2 |  |
|  | expander |  |  |  |  |  |  |  |  | 10 |
|  | non-lead heat stabilizer | 5 | 5 | 5 | 5 | 5 | 5 | 5 | 5 | 5 |
| Evaluation result | damage resistance | ⊚ | ⊚ | ⊚ | ⊚ | ⊚ | ⊚ | ⊚ | ⊚ | ⊚ |
|  | tear resistance | ⊚ | ⊚ | ⊚ | ⊚ | ⊚ | ⊚ | ⊚ | ⊚ | ⊚ |
|  | low-temperature flexibility | ⊚ | ⊚ | ⊚ | ⊚ | ⊚ | ⊚ | ⊚ | ⊚ | ⊚ |

TABLE 3

|  |  | Comparative Example |  |  |  |  |  |
|---|---|---|---|---|---|---|---|
|  |  | 1 | 2 | 3 | 4 | 5 | 6 |
| Polyvinyl chloride | degree of polymerization 1300 | 100 | 100 | 100 | 100 | 100 | 100 |
|  | degree of polymerization 2500 |  |  |  |  |  |  |
| Plasticizer | phthalic acid ester |  |  |  |  |  |  |
|  | trimellitic acid ester | 25 | 25 | 25 | 25 | 12.5 | 32.5 |
|  | pyromellitic acid ester |  |  |  |  |  |  |
|  | adipic acid ester |  |  |  |  |  |  |
|  | sebacic acid ester |  |  |  |  |  |  |
| Thermoplastic polyurethane elastomer | ether-based•A73 |  |  |  |  |  |  |
|  | ether-based•A75 |  | 0.005 | 12 |  | 5 | 5 |
|  | ether-based•A85 |  |  |  |  |  |  |
|  | ether-based•A90 |  |  |  |  |  |  |
|  | ester-based•A77 |  |  |  |  |  |  |
| Additive | processing aid |  |  |  |  |  |  |
|  | low-temperature modifier |  |  |  | 10 |  |  |
|  | expander |  |  |  |  |  |  |

TABLE 3-continued

|  |  | Comparative Example | | | | | |
| --- | --- | --- | --- | --- | --- | --- | --- |
|  |  | 1 | 2 | 3 | 4 | 5 | 6 |
|  | non-lead heat stabilizer | 5 | 5 | 5 | 5 | 5 | 5 |
| Evaluation result | damage resistance | ⊚ | ⊚ | X | X | ⊚ | X |
|  | tear resistance | X | X | ⊚ | X | X | ⊚ |
|  | low-temperature flexibility | X | X | ⊚ | ○ | X | ⊚ |

In Comparative Example 1, no thermoplastic polyurethane elastomer was not blended into the polyvinyl chloride, and thus if the plasticizer was added in a small amount, low-temperature flexibility and tear resistance were not satisfactory. In Comparative Example 2, too little thermoplastic polyurethane elastomer was blended into the polyvinyl chloride, and thus if the plasticizer was added in a small amount, its low-temperature flexibility and tear resistance were not satisfactory. In Comparative Example 3, too much thermoplastic polyurethane elastomer was blended into the polyvinyl chloride, and thus damage resistance was not satisfactory. In Comparative Example 4, a low-temperature modifier (MBS) was blended into the polyvinyl chloride instead of the thermoplastic polyurethane elastomer, and thus low-temperature flexibility was satisfactory but tear resistance was not. In Comparative Example 5, a predetermined amount of the thermoplastic polyurethane elastomer was blended into the polyvinyl chloride, but too little the plasticizer was added, and thus, low-temperature flexibility and tear resistance were not satisfactory. In Comparative Example 6, a predetermined amount of a thermoplastic polyurethane elastomer was blended into the polyvinyl chloride, but a plasticizer was added in an excessive amount, and thus damage resistance was not satisfactory.

In contrast, with the working examples satisfying the configurations of the present design, damage resistance, low-temperature flexibility, and tear resistance were satisfactory. Moreover, as can be seen by comparing the working examples, the soft segment of the thermoplastic polyurethane elastomer included a polyether chain, and thus the composition had excellent low-temperature flexibility and tear resistance. Also, since the Shore hardness of the thermoplastic polyurethane elastomer was in a range of A75 to A85, the composition had an excellent balance between damage resistance, low-temperature flexibility, and tear resistance.

Although embodiments of the present design were described in detail above, the present invention is not merely limited to the above-described embodiments, and it will be appreciated that various modifications can be made without departing from the gist of the present invention.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An insulated electric wire, comprising:
   a conductor; and
   an electric wire coating material coating an outer circumference of the conductor, the electric wire coating material having a composition that comprises polyvinyl chloride, a plasticizer in an amount of 15 to 30 parts by mass with respect to 100 parts by mass of the polyvinyl chloride, and a thermoplastic polyurethane elastomer in an amount of 0.1 to 5 parts by mass with respect to 100 parts by mass of the polyvinyl chloride, wherein a soft segment of the thermoplastic polyurethane elastomer includes a polyether chain or a polyester chain, and wherein the composition of the electric wire coating does not include methyl methacrylate-butadiene-styrene resin.

2. The insulated electric wire according to claim 1, wherein the soft segment of the thermoplastic polyurethane elastomer includes a polyether chain.

3. The insulated electric wire according to claim 1, wherein a Shore hardness of the thermoplastic polyurethane elastomer is in a range of A75 to A85.

4. The insulated electric wire according to claim 1, wherein the plasticizer is one or more of phthalic acid esters, trimellitic acid esters, pyromellitic acid esters, adipic acid esters, and sebacic acid esters.

* * * * *